(12) United States Patent
Nishikawa et al.

(10) Patent No.: US 8,716,881 B2
(45) Date of Patent: May 6, 2014

(54) THREE PHASE INVERTER TYPE GENERATOR

(75) Inventors: Akihiro Nishikawa, Hiroshima (JP); Shin'ichiro Kimura, Hiroshima (JP)

(73) Assignee: Yamabiko Corporation, Tokyo (JP)

( * ) Notice: Subject to any disclaimer, the term of this patent is extended or adjusted under 35 U.S.C. 154(b) by 224 days.

(21) Appl. No.: 13/454,939

(22) Filed: Apr. 24, 2012

(65) Prior Publication Data

US 2012/0292917 A1 Nov. 22, 2012

(30) Foreign Application Priority Data

Apr. 25, 2011 (JP) ................................ 2011-097218

(51) Int. Cl.
*F03D 9/00* (2006.01)
(52) U.S. Cl.
USPC .............................................. 290/55; 290/44
(58) Field of Classification Search
USPC .................................................... 290/55, 44
See application file for complete search history.

(56) References Cited

U.S. PATENT DOCUMENTS

| | | | |
|---|---|---|---|
| 4,184,075 A * | 1/1980 | Ebersberger | 378/105 |
| 5,031,086 A * | 7/1991 | Dhyanchand et al. | 363/37 |
| 5,281,905 A * | 1/1994 | Dhyanchand et al. | 322/32 |
| 5,777,459 A * | 7/1998 | Bansal et al. | 322/47 |
| 6,995,546 B2 | 2/2006 | Fujikawa | |
| 2001/0024102 A1 * | 9/2001 | Egami | 318/801 |
| 2008/0068870 A1 * | 3/2008 | Eguchi et al. | 363/37 |
| 2008/0083705 A1 * | 4/2008 | Peters | 219/61 |

FOREIGN PATENT DOCUMENTS

| | | |
|---|---|---|
| JP | 8251941 | 9/1996 |
| JP | 4189835 | 3/2004 |

* cited by examiner

*Primary Examiner* — Truc Nguyen (74) *Attorney, Agent, or Firm* — Baker & Hostetler LLP (57) ABSTRACT

A three phase inverter-type generator includes an engine, an AC generator driven by the engine, a rectifier for converting the output of the AC generator into a DC voltage, a three phase inverter for converting the output of the rectifier into a three phase AC voltage, a three phase transformer connected to the output side of the three phase inverter, and a filter, whereby the three phase transformer has a primary-side connection and a secondary-side connection having a three phase connection, the secondary-side connection having first through third windings forming a star connection in which one end of each is respectively connected to a neutral point, with each having the same number of windings and a mutual phase difference of 120°.

8 Claims, 10 Drawing Sheets

(c) <PRIMARY SIDE>  <SECONDARY SIDE>

(d) <PRIMARY SIDE>  <SECONDARY SIDE>

(e) <PRIMARY SIDE> VOLTAGE CORRECTION PORTION  <SECONDARY SIDE>

THREE PHASE INVERTER TYPE GENERATOR

TECHNICAL FIELD

The present invention pertains to a three phase inverter-type generator, and more particularly to a three phase inverter-type generator capable of three phase four wire output and of single phase three wire output.

BACKGROUND ART

In portable AC generators used at outdoor construction sites and the like, there may be a need for not only a three phase 200V output used for motive force, but also a single phase 100V or single phase 200V output for lighting, electrical heating equipment, etc. One example of an AC generator capable of simultaneously outputting a three phase four wire output and a single phase three wire output is set forth in Patent Citation 1 below.

PRIOR ART REFERENCES

Patent References

Patent Citation 1: JP4189835

DISCLOSURE OF THE INVENTION

Problems the Invention Seeks to Resolve

However, the AC generator set forth in Patent Citation 1 is a synchronous generator. Therefore in order to output AC power at a desired frequency from this AC generator, the rpm of the engine driving the AC generator must be fixed. For example, to obtain an output at the commercial power supply frequency of 50 Hz or 60 Hz, the rpm of the AC generator must be fixed at 3000 rpm or 3600 rpm.

Therefore in order to simultaneously output three phase four wire and single phase three wire at a desired frequency irrespective of engine rpm, the adoption of the AC generator set forth in Patent Citation 1 is contemplated as an AC generator constituting an inverter-type generator.

However, in an arrangement whereby an inverter-type AC generator is substituted by the AC generator set forth in Patent Citation 1, it becomes necessary not only to provide a three phase inverter on the three phase four wire output side of the AC generator, but also to provide a single phase inverter on the single phase three wire output side thereof. This increases the complexity and cost of the apparatus. Control is also complicated due the need to control both the "three phase inverter" and the "single phase inverter."

Small size and light weight are also required, particularly in portable generators.

The first objective of the present invention, therefore, is to provide, in a simple configuration, a three phase inverter-type generator with which a three phase four wire output and a single phase three wire output can be simultaneously output at a desired frequency, irrespective of engine rpm.

A second objective of the present invention is to provide a compact, light weight three phase inverter-type generator.

Means for Resolving the Problem

In order to achieve the above first objective, the three phase inverter-type generator of the first invention comprising: an engine; an AC generator driven by the engine; a rectifier for converting an output of the AC generator into a DC voltage; a three phase inverter for converting an output of the rectifier into a three phase AC voltage; and a three phase transformer connected to an output side of the three phase inverter; wherein the three phase transformer has a primary-side connection having a three phase connection and a secondary-side connection; the secondary-side connection having, first through third windings forming a star connection in which one end of each is respectively connected to a neutral point, with each having the same number of windings and a mutual phase difference of 120°; a first additional winding connected at one end to a position located a predetermined number of windings from the neutral point on the second winding, with the same number of windings as the predetermined number of windings, and having the opposite phase to that of the third winding; and a second additional winding connected at one end to a position which is the same number of windings as the predetermined number of windings from the neutral point on the third winding, with the same number of windings as the predetermined number of windings, and having the opposite phase to that of the second winding; whereby a three phase four wire output is output from the respective other ends of the first through third windings and from the neutral point, and a single phase three wire output is output from the respective other ends of the first and second additional windings and from the neutral point.

In order to achieve the above first objective, the three phase inverter-type generator of the second invention comprising: an engine; an AC generator driven by the engine; a rectifier for converting the output of the AC generator into a DC voltage; a three phase inverter for converting the output of the rectifier into a three phase AC voltage; and a three phase transformer connected to the output side of the three phase inverter; wherein the three phase transformer has a primary-side connection having a three phase connection and a secondary-side connection; the secondary-side connection has: first through third windings forming a star connection in which one end of each is respectively connected to a neutral point, with each having the same number of windings and a mutual phase difference of 120°; a first additional winding in which one end is connected at a position located a predetermined number of windings from the neutral point on the second winding, with half the number of windings as the predetermined number of windings, and having the same phase to as first winding; and a second additional winding connected at one end to a position which is the same number of windings as the predetermined number of windings from the neutral point on the third winding, with half the number of windings as the predetermined number of windings, and having the same phase to as first winding; whereby a three phase four wire output is output from the respective other ends of the first through third windings and from the neutral point, and a single phase three wire output is output from the respective other ends of the first and second additional windings and from the neutral point.

In the first and second invention, the connection on the secondary side of the respective three phase transformers is a multi-output connection capable of simultaneously outputting three phase four wire output and single phase three wire output. Therefore a simultaneous output (multi-output) can be achieved from both a three phase four wire output and a single phase three wire output at a desired frequency, irrespective of engine rpm, with a three phase inverter alone, avoiding the need for both a three phase inverter and a single phase inverter. By this means, the first and second inventions can, using a simple configuration, simultaneously output a three phase four wire output and a single phase three wire output at a desired frequency irrespective of engine rpm.

It happens that multi-output connection has, in addition to first through third windings constituting star connection, first and second additional windings. Therefore in a multi-output connection the number of windings in the total wiring windings is greater than in a star connection. When the number of windings increases, a larger iron core is required to assure space for winding the windings. As a result, a three phase transformer with a multi-output connection on the secondary side is heavier and larger than a three phase transformer with a star connection.

Therefore in the first and second invention, a rectangle wave output of the three phase inverter is preferably input into the three phase transformer, and further comprising a filter for obtaining a sinusoidal AC voltage from the output of the three phase transformer.

In a three phase inverter-type generator thus constituted, a high frequency three phase transformer is provided, into which the rectangle wave output of a three phase inverter is input. Input into this three phase transformer is a rectangle wave output voltage generated by, for example, the 10-20 kHz carrier frequency of a three phase inverter. The three phase transformer can therefore be made more compact and lighter weight than a low frequency transformer using the 50 Hz or 60 Hz AC voltage of a commercial power supply. As a result, the three phase inverter-type generator can be made more compact and light weight.

It is also preferable for the first and second inventions to further comprises: a voltage detection means for detecting output voltages on the three phase four wire output; a correction computation means for calculating deviations between detected values and target values for the output voltages of the three phase four wire output, and computing correction values based on that calculated deviations; and an inverter control means for individually controlling line voltages input from the three phase inverter to the three windings on the primary-side connection of the three phase transformer based on the correction values.

Separate feedback control of the respective input voltages (line voltages) on the three windings on the primary side connection of the three phase transformer based on the three phase four wire output enables the elimination of any unbalance in the three phase four wire output.

In order to achieve the above second objective, the three phase inverter-type generator of the third invention comprising: an engine; an AC generator driven by the engine; a rectifier for converting an output of the AC generator into a DC voltage; a three phase inverter for converting an output of the rectifier into a three phase AC voltage; a three phase transformer for transforming an output of the three phase inverter; and a filter for obtaining a sinusoidal AC voltage from an output of the three phase transformer, wherein the three phase transformer has a primary-side connection having a three phase connection and a secondary-side connection, the secondary-side connection has first through third windings forming a star connection in which one end of each is respectively connected to a neutral point, with each having the same number of windings and a mutual phase difference of 120°, and wherein a three phase four wire output is output from the respective other ends of the first through third windings and from the neutral point.

The three phase inverter-type generator of the third invention thus constituted provides a three phase transformer, being a high frequency transformer, between the three phase inverter and the filter. Input into this three phase transformer is a rectangle wave output voltage generated by, for example, the 10-20 kHz carrier frequency of a three phase inverter. The three phase transformer can therefore be made more compact and lighter weight than a low frequency transformer using the 50 Hz or 60 Hz AC voltage of a commercial power supply. As a result, the three phase inverter-type generator can be made more compact and light weight.

It is also preferable for the third invention to further comprises: a voltage detection means for detecting output voltages on the three phase four wire output; a correction computation means for calculating deviations between detected values and target values for the output voltages of the three phase four wire output, and computing correction values based on that calculated deviations; and an inverter control means for individually controlling line voltages input from the three phase inverter to the three windings on the primary-side connection of the three phase transformer based on the correction values.

Separate feedback control of the respective input voltages on the three windings on the primary side connection of the three phase transformer based on the three phase four wire output enables the elimination of any unbalance in the three phase four wire output.

Effect of the Invention

Thus the inverter-type generator of the first invention and second invention is able to provide a simple configuration three phase inverter-type generator capable of simultaneously outputting a three phase four wire output and a single phase three wire output at a desired frequency, regardless of engine rpm.

Also, with the inverter-type generator of the third invention, a smaller size and lighter weight can be achieved.

BRIEF DESCRIPTION OF FIGURES

FIG. 2: (a): an explanatory diagram of the primary-side connection and line voltage in a three phase transformer; (b): a vector diagram of line voltage and phase voltage on the primary-side connection.

FIG. 4: (a): an explanatory diagram of the secondary side connection and line voltage in the three phase transformer of the first embodiment; (b): a vector diagram of line voltage and phase voltage on the secondary side connection.

FIG. 6: (a) through (e) are explanatory diagrams of output voltage control.

FIG. 9: (a): an explanatory diagram of the secondary side connection and the line voltage in the three phase transformer of the second embodiment; (b): a vector diagram of the line voltage and phase voltage on the secondary side connection.

BEST MODES FOR EMBODYING THE INVENTION

Below we explain an example of the first invention as a first embodiment. Note that in the explanation below, "line voltage vector" is also expressed as "line voltage," and "phase voltage vector" is also expressed as "phase voltage." Also, in this patent application the "inter-terminal voltages" between the terminals U, V, and W and the terminals u, v, and w in the three phase connection on the three phase transformer described below, i.e., $V_{U-V}, V_{V-W}, V_{W-U},$ and $V_{u-v}, V_{v-w}, V_{w-u},$ are expressed as "line voltage". And voltages using the neutral point O as a way of extracting voltages from the three phase four wire output on the secondary-side connection on the three phase transformaer described belos, i.e., $V_{u-O}, V_{v-O}, V_{w-O}, V_{L1-O}, V_{L2-O}, V_{L1-L2}$ are also expressed as "line voltage".

Figure 1:
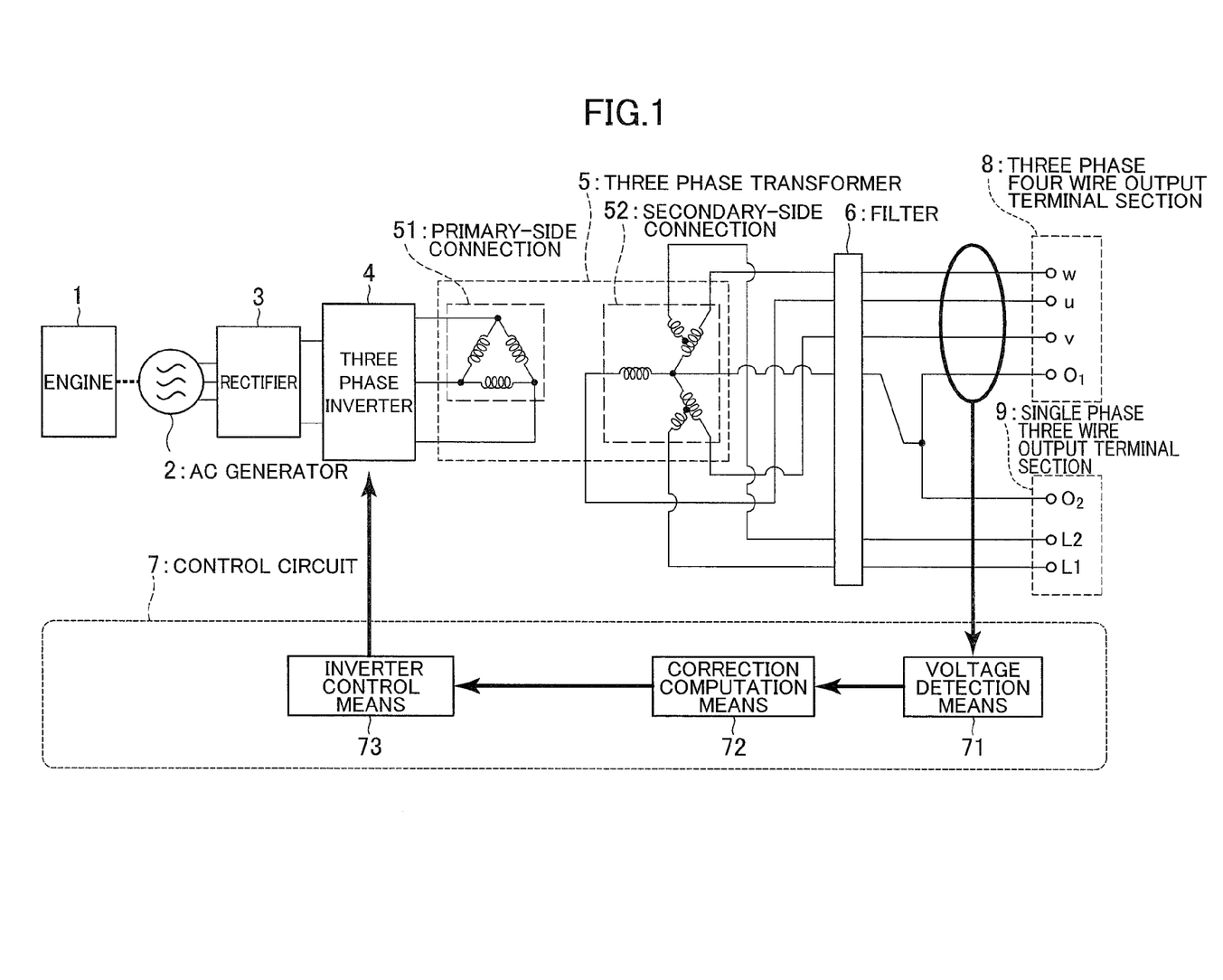
FIG. 1: A block circuit diagram explaining the configuration of a three phase inverter-type generator according to a first embodiment of the present invention.

First, referring to the FIG. 1 block diagram, we discuss the configuration of a three phase inverter-type generator according to the first embodiment. The three phase inverter-type generator shown in FIG. 1 is furnished with an engine 1, an AC generator 2 driven by engine 1, a rectifier 3 for converting the output of the AC generator 2 to a DC voltage, a three phase inverter 4 for converting the output of the rectifier 3 to a three phase AC voltage, a three phase transformer 5 into which the rectangle wave output of the three phase inverter 4 is input, a low pass filter 6 for obtaining a sinusoidal AC voltage from the rectangle wave output of the three phase transformer 5, and a control circuit 7 for controlling the three phase inverter 4.

The three phase transformer 5 has a primary-side connection 51 with a three phase connection and a secondary-side connection 52.

Figure 2:
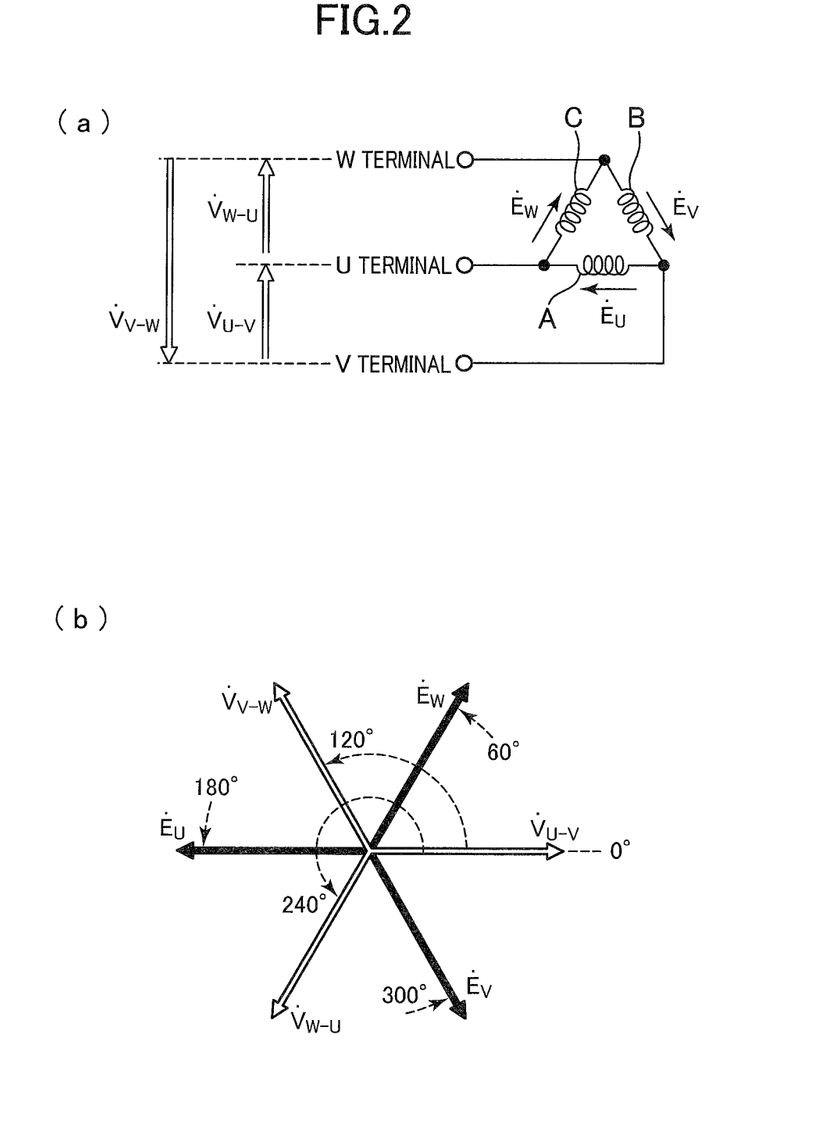

First, referring to FIG. 2, we discuss the configuration and line voltage of the primary-side connection.

As shown in FIG. 2(a), the primary-side connection 51 has three delta-connected windings A through C with an equal number of windings. Disposed as input terminals to the primary-side connection 51 are the input terminal U connected between winding A and winding C, the input terminal V connected between winding B and winding A, and the input terminal W connected between winding C and winding B.

Note that it is acceptable to employ a star connection in lieu of a delta connection as the three phase connection.

Regarding the line voltage on the primary-side connection, the voltage between the input terminal U and input terminal V connected at both ends of the winding A shall be the "line voltage $V_{U-V}$," the voltage between the input terminal V and input terminal W connected at both ends of the winding B shall be the "line voltage $V_{V-W}$," and the voltage between the input terminal W and input terminal U connected at both ends of the winding C shall be the "line voltage $V_{W-U}$." Note that in the diagram a dot is appended above the symbols showing line voltage vectors.

As shown in FIG. 2(b), relative to the "line voltage $V_{U-V}$" (phase offset angle=0°), the input from the three phase inverter is input to the primary-side connection so that the "line voltage $V_{V-W}$" phase is delayed by 120° and the "line voltage $V_{W-U}$" phase is delayed by 240°.

Because the primary-side connection is a delta connection, the "line voltage $V_{U-V}$" and "phase voltage $E_U$" on the first winding A, the "line voltage $V_{V-W}$" and "phase voltage $E_V$" on the second winding B, and the "line voltage $V_{W-U}$" and "phase voltage $E_W$" on the third winding C respectively have the same "voltage size" and opposite "phases." Therefore relative to the phase on the "line voltage $V_{U-V}$," the phase of the "phase voltage $E_U$" on the first winding A is delayed by 180°, the phase of the second winding B "phase voltage $E_V$" is delayed by 300°, and the phase of the "phase voltage $E_W$" on the third winding C is delayed by 60°.

Figure 3:
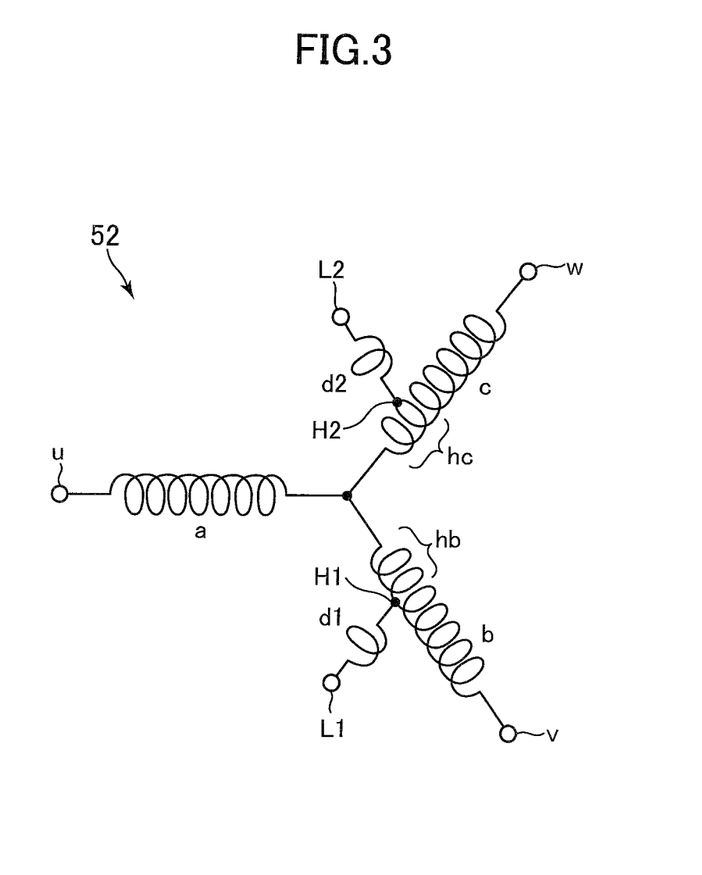
FIG. 3: A circuit diagram of the secondary-side connection in a three phase transformer in the first embodiment.

Next, referring to FIG. 3, we discuss the configuration secondary-side connection 52.

As shown in FIG. 3, the secondary-side connection 52 has first through third windings a through c and first and second additional windings d1 and d2. First through third windings a through c form a star connection in which one end of each is respectively connected at a neutral point O. First through third windings a through c each have the same number of windings, and also have a mutual phase difference of 120°.

One end of the first additional winding d1 is connected at a position H1, which is a predetermined number of windings N from the neutral point O on the second winding b. The first additional winding d1 has the same number of windings as that predetermined number of windings N, and has the opposite phase to that of the third winding c. I.e., first additional winding d1 has the same number of windings N as the partial winding hb from the neutral point O within the second winding b to the position H1, and is connected to a position H1 on the second winding b so as to be in the opposite phase relative to the third winding c.

One end of the second additional winding d2 is connected at a position H2, which is the same number of windings as the predetermined number of windings N from the neutral point O on the third winding c. The second additional winding d2 has the same number of windings as the predetermined lo number of windings N, and has the opposite phase to that of the second winding b. I.e., second additional winding d2 has the same number of windings N as the partial winding he from the neutral point O within the third winding c to the position H2, and is connected to the position H2 on the second winding c so as to be in opposite phase relative to the second winding b phase.

As shown in FIG. 1, the other ends (the u terminal, v terminal, and w terminal) of the first through third windings (a through c) in the secondary-side connection 52 and the neutral point O constitute a three phase four wire output terminal section 8. Also, the respective other ends (the L1 terminal and L2 terminal) of the first and second additional windings (d1 and d2) and the neutral point O constitute a single phase three wire output terminal section 9.

Figure 4:
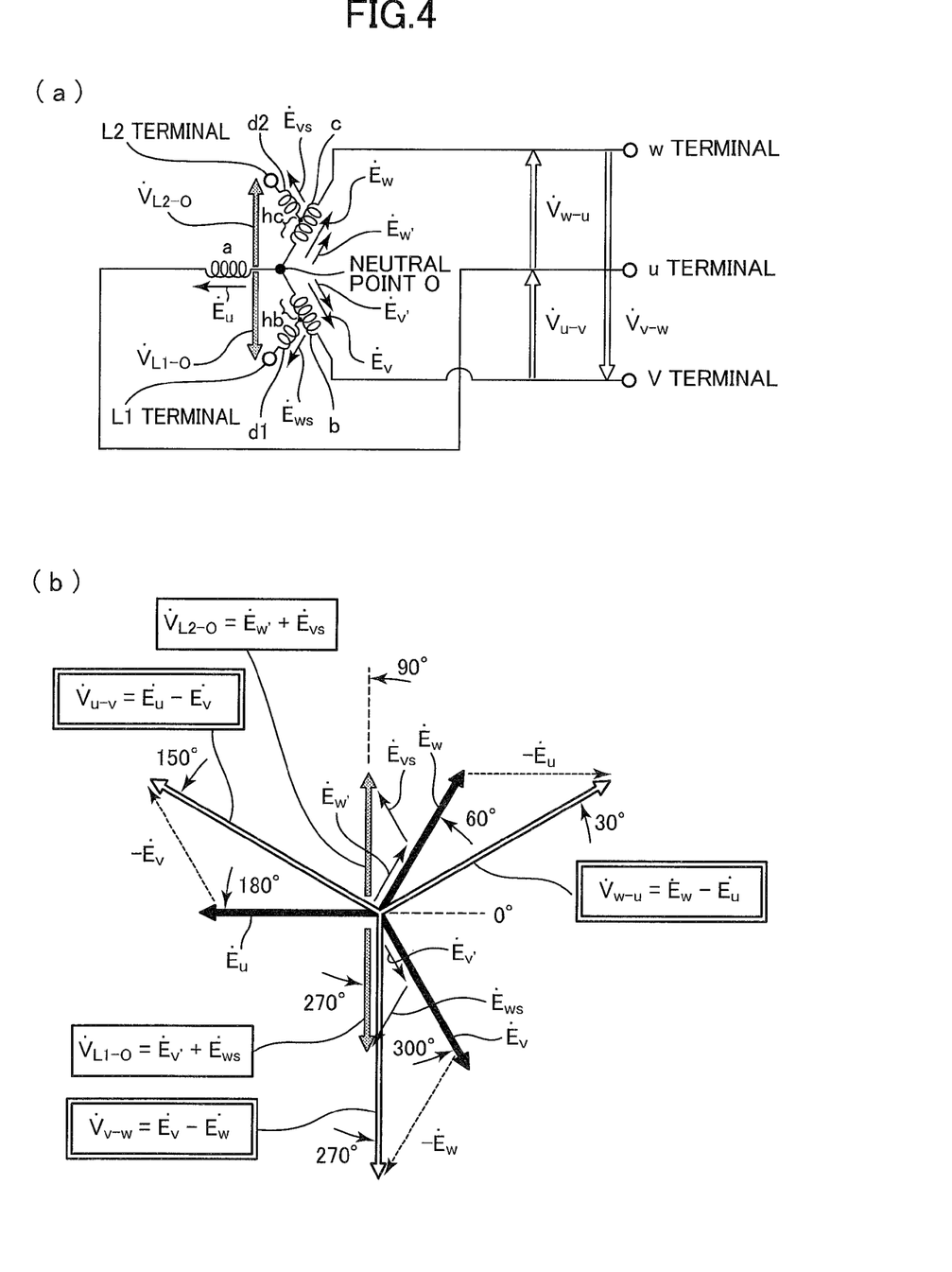

Next, referring to FIG. 4, we discuss the phase voltage and line voltage of the secondary-side connection.

As shown in FIG. 4(a), the phase voltage on the first winding a of the secondary-side connection is deemed " $E_u$," the phase voltage on the second winding b is "$E_v$," the phase voltage on the third winding c is "$E_w$," the phase voltage on the first additional winding d1 is "$E_{ws}$," and the phase voltage on the second additional winding d2 is "$E_{vs}$." Furthermore, the phase voltage of partial winding hb from the neutral point O to the position H1 within the second winding b shall be "$E_v$," and the phase voltage of partial winding he from the neutral point O to the position H2 within the third winding c shall be "$E_w$."

Figure 5:
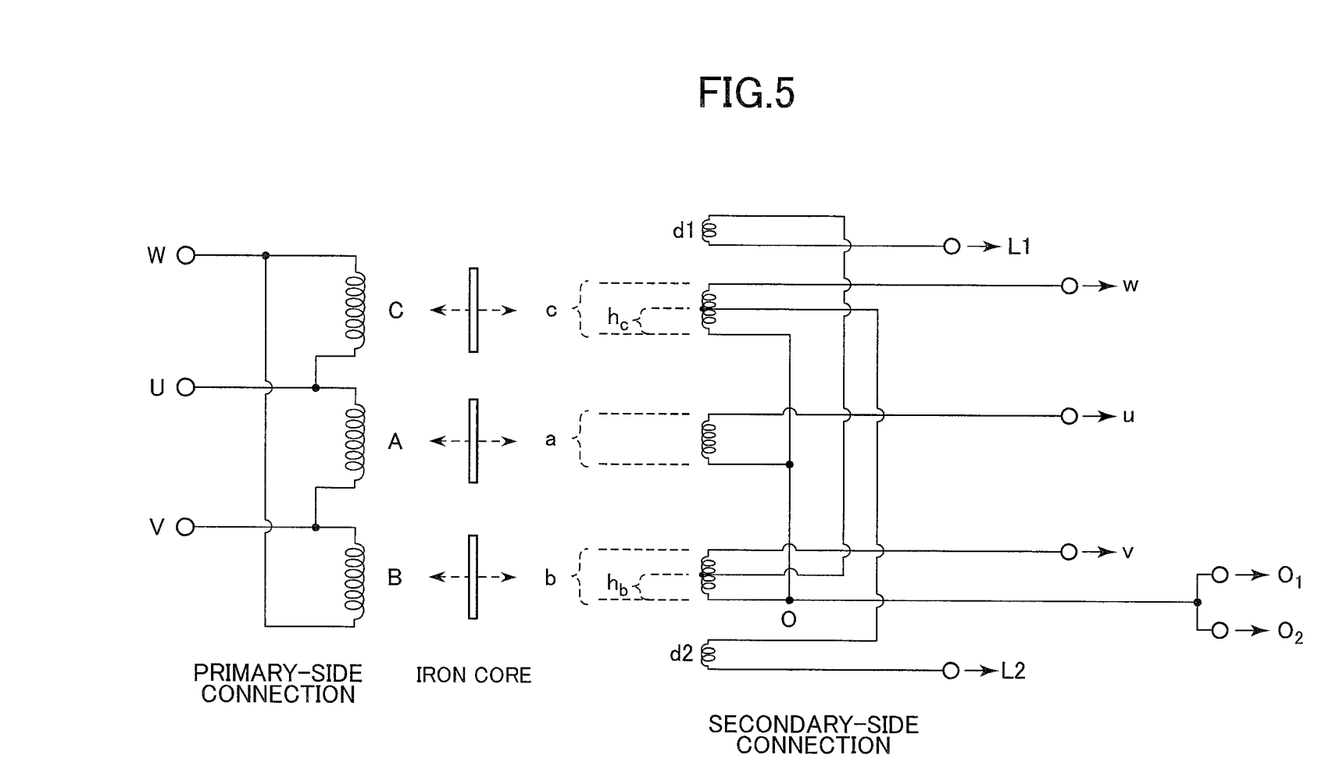
FIG. 5: A circuit diagram showing the relationship between the primary-side connection and the secondary-side connection on a three phase transformer.

Here, referring to FIG. 5, we discuss the phase voltage relationship between the primary-side and secondary-side of a three phase transformer.

The first winding A on the primary-side and the first winding a on the secondary-side are wound so that the direction of winding is the same relative to a common iron core. Thus the windings constituting the primary-side connection and the secondary-side connection are such that the magnetic flux $\phi_A$ generated on first winding A on the primary-side is conveyed to the first winding a on the secondary side, and changes in the magnetic flux $\phi$ generated by the line voltage have the same direction on the primary and secondary sides. As a result, the "phase voltage $E_U$" generated on the primary-side and the "phase voltage $E_u$" generated on the secondary-side winding have the same phase.

The primary-side second winding B and the secondary-side second winding b are wound on a shared iron core so as to have the same winding direction, and the primary-side second winding B and secondary-side second additional winding d2 are wound on that shared iron core so as to have opposite winding directions. The magnetic flux $\phi_B$ generated on the primary-side second winding B is thereby transmitted to the secondary-side second winding b and second additional winding d2. As a result, the secondary-side second winding b "phase voltage $E_v$" has the same phase as the primary-side second winding B "phase voltage $E_V$," while on the other hand the secondary-side second additional winding d2 "phase voltage $E_{vs}$" has the opposite phase as the primary-side second winding B "phase voltage $E_V$".

The primary-side third winding C and the secondary-side third winding c are wound on a shared iron core so as to have the same winding direction, and the primary-side third winding C and secondary-side first additional winding d1 are wound on that shared iron core so as to have opposite winding directions. The magnetic flux $\phi_C$ generated on the primary-side third winding C is thereby transmitted to the secondary-side third winding c and first additional winding d1. As a result, the secondary-side third winding c "phase voltage $E_w$" has the same phase as the primary-side third winding C "phase voltage $E_W$," while on the other hand the secondary-side first additional winding d1 "phase voltage $E_{ws}$" has the opposite phase as the primary-side third winding C "phase voltage $E_W$."

As a result, as shown in FIG. 4(b), relative to the phase of the "line voltage $V_{U\text{-}V}$" on the primary-side (phase offset angle=0°), the phase of the "phase voltage $E_u$" on the secondary-side first winding a is delayed by 180°, the phase of the "phase voltage $E_v$" on the secondary-side second winding b is delayed by 300°, and the phase of the "phase voltage $E_w$" on the secondary-side third winding c is delayed by 60°.

If each line voltage is input so that the size of the voltage vector on the primary-side $|V_{U\text{-}V}|=|V_{U\text{-}W}|=|V_{W\text{-}U}|$, then if the winding ratio on the primary-side and secondary-side, i.e. the winding ratio between "first winding A" and "first winding a," the winding ratio between "second winding B" and "second winding b," and the winding ratio between "third winding C" and "third winding c" are all 1:(1/x), the size of the secondary-side phase voltage $|E_u|(=|E_v|=|E_w|)$ relative to the primary-side phase voltage $|E_U|(=|E_V|=|E_W|)$ is:

$|E_u|=(1/X)\times|E_U|=(1/X)\times|V_{U\text{-}V}|$.

Note that when X=1, for example, $|E_u|=|E_U|$.

The "phase voltage $E_{v'}$" of the partial winding hb on the second winding b is such that when the ratio between the number of windings on the second winding b and the number of windings on the partial winding hb is second winding b:partial winding hb=1/1(Y), the size of the "phase voltage $E_{v'}$" on the partial winding becomes:

$|E_{v'}|=(1/Y)\times|E_v|$.

Furthermore, the number of windings on the first additional winding d1 is the same as the number of windings on the partial winding hb, therefore the size of the "phase voltage $E_{ws}$" of the first additional winding d1 becomes:

$|E_{ws}|=(1/Y)\times|E_v|$.

For example, when 1/Y=1/2, $|E_{ws}|=|E_{v'}|=(1/2)\times|E_v|$.

If the winding ratio of the third winding c to the number of windings of the partial winding hc is third winding c:partial winding hc=1:(1/Y), then the "phase voltage $E_{w'}$" of the partial winding hc of the third winding c becomes, $|E_{w'}|=(1/Y)\times|E_w|$.

Furthermore, the number of windings on the second additional winding d2 is the same as the number of windings on the partial winding hc, therefore the size of the "phase voltage $E_{vs}$" of the second additional winding d2 is given by:

$|E_{vs}|=(1/Y)\times|E_w|$.

For example, when 1/Y=1/2, $|E_{vs}|=|E_{w'}|=(1/2)\times|E_w|$.

Also, as shown in FIG. 4(a), output terminal u connected to the other end of first winding a, output terminal v connected to the other end of second winding b, and output terminal w connected to the other end of third winding c are disposed as three phase output terminals in the secondary-side connection 52. A three phase four wire-type output is obtained from these output terminals u, v, and w, and neutral point O.

With respect to the line voltages on the three phase output on the secondary-side connection, the line voltage between output terminal u and output terminal v shall be "$V_{u\text{-}v}$," the line voltage between output terminal v and output terminal w shall be "$V_{v\text{-}w}$," and the line voltage between output terminal w and output terminal u shall be "$V_{w\text{-}u}$."

Note that it is also acceptable to extract "line voltage $V_{u\text{-}O}$" between output terminal u and neutral point O, "line voltage $V_{v\text{-}O}$" between output terminal v and neutral point O, and "line voltage $V_{w\text{-}O}$" between output terminal w and neutral point O as the three phase four wire output. The voltage vectors, as shown in FIGS. 4(a) and 4(b), become $V_{u\text{-}O}=E_u$, $V_{v\text{-}O}=E_v$, and $V_{w\text{-}O}=E_w$.

In addition, as line voltages on the low voltage side of the single phase three wire output on the secondary-side connection, the line voltage between output terminal L1 and neutral point O can be extracted as "$V_{L1\text{-}O}$" and the line voltage between output terminal L2 and the neutral point O as "$V_{L2\text{-}O}$."

For the line voltage on the high voltage side in a single phase three wire output, the line voltage between output terminal L2 and output terminal L1 can be extracted as "$V_{L2\text{-}L1}$."

Next, referring to FIG. 4(b), we discuss the phases of the three phase line voltage on the secondary-side.

The secondary-side "line voltage $V_{u\text{-}v}$," as the sum of the first winding a "phase voltage $E_u$" vector and the second winding b "phase voltage $E_v$" opposite vector, is $V_{u\text{-}v}=E_u-E_v$.

The phase of this "line voltage $V_{u\text{-}v}$" on the secondary-side is delayed by 150° relative to the phase of the "line voltage $V_{U\text{-}V}$" the primary-side.

Also, the secondary-side "line voltage $V_{v\text{-}w}$," as the sum of the second winding b "phase voltage $E_v$" vector and the third winding c "phase voltage $E_w$" opposite vector, is given by:

$V_{v\text{-}w}=E_v-E_w$.

The phase of this "line voltage $V_{v\text{-}w}$" on the secondary-side is delayed by 270° relative to the phase of the "line voltage $V_{U\text{-}V}$" the primary-side.

Also, the secondary-side "line voltage $V_{w\text{-}u}$," as the sum of the third winding c "phase voltage $E_w$" vector and the first winding a "phase voltage $E_u$" opposite vector, is given by:

$V_{w\text{-}u}=E_w-E_u$.

The phase of this "line voltage $V_{w\text{-}u}$" on the secondary-side is delayed by 30° relative to the phase of the "line voltage $V_{U\text{-}V}$" the primary-side.

Next we discuss the size of the secondary-side three phase output line voltages.

In the three phases output (balanced three phase output), the phase voltages on the first through third windings are mutually equal, and are shown by $|E_u|=|E_v|=|E_w|$.

Furthermore, in the three phase output (balanced three phase output), the line voltages on the first through third windings are also mutually equal, and are represented by $|V_{u-v}|=|V_{v-w}|=|V_{w-u}|$.

The phase difference between the first winding a "phase voltage $|E_u|$" and the second winding b "phase voltage $E_v$" is 120°. Therefore the relationship between the size $|V_{u-v}|$ of the secondary-side "line voltage $V_{u-v}$" and the size $|E_u|$ of the secondary-side three phase output section phase voltage becomes $|V_{u-v}|=\sqrt{3}x|E_u|$.

Furthermore, when the winding ratio of the "primary-side winding" and the "secondary-side winding" is 1:(1/X), $|E_u|=(1/X)x|E_U|$, therefore the relationship between the size $|V_{u-v}|$ of the "secondary-side three phase output section line voltage" and the size $|E_U|$ of the "primary-side phase voltage" is:

$|V_{u-v}|=\sqrt{3}x|E_u|=\sqrt{3}x(1/X)x|E_U|$.

Furthermore, in a delta connection, the size $|E_U|$ of the "primary-side phase voltage" and the size $|V_{U-V}|$ of the "primary-side line voltage" is:

$|E_U|=|V_{U-V}|$, therefore the relationship between the size $|V_{u-v}|$ of the "secondary-side three phase output section line voltage" and the size $|V_{U-V}|$ of the "primary-side line voltage" is:

$|V_{u-v}|=\sqrt{3}x(1/X)x|E_U|=\sqrt{3}x(1/X)x|V_{U-V}|$.

I.e., $|V_{u-v}|=\sqrt{3}x(1/X)x|V_{U-V}|$.

Similarly, $|V_{v-w}|=\sqrt{3}x(1/X)x|V_{V-W}|$, and $|V_{w-u}|=\sqrt{3}x(1/X)x|V_{W-U}|$.

Next, referring to FIG. 4(b), we discuss the phases of the line voltage on a secondary-side single phase three wire output.

The secondary-side "line voltage $V_{L1-O}$", as the vector sum of the second winding b partial winding hb "phase voltage $E_v$" and first additional winding d1 "phase voltage $E_{ws}$," becomes $V_{L1-O}=E_v+E_{ws}$.

The phase of this secondary-side "line voltage $V_{L1-O}$" is delayed by 270° relative to the phase of the primary-side "line voltage $V_{U-V}$".

The secondary-side "line voltage $V_{L2-O}$," as the vector sum of the third winding c partial winding hc "phase voltage $E_w$," and second additional winding d2 "phase voltage $E_{vs}$," becomes $V_{L2-O}=E_w+E_{vs}$.

The phase of this secondary-side "line voltage $V_{L2-O}$" is delayed by 90° relative to the phase of the primary-side "line voltage $V_{U-V}$".

Next we discuss the size of the secondary-side single phase three wire output line voltage.

In the single phase three wire output, the size $|E_v|$ of the secondary-side partial winding hb phase voltage, the size $|E_w|$ of the partial winding hc phase voltage, the size $|E_{ws}|$ of the first additional winding d1 phase voltage, and the size $|E_{vs}|$ of the second additional winding d2 phase voltage are mutually equal:

$|E_v|=|E_w|=|E_{ws}|=51\ E_{vs}|$.

Moreover, the size of the secondary-side "line voltage $V_{L1-O}$" and the size of the "line voltage $W_{L2-O}$" are mutually equal:

$|V_{L1-O}|=|V_{L2-O}|$.

The phase difference between the partial winding hb "phase voltage $E_v$," and the first additional winding d1 "phase voltage $E_{ws}$" is 120°. Therefore the relationship between the size $|V_{L1-}|$ of the secondary-side "line voltage $V_{L1-O}$" and the size $|E_v|$ I of the secondary-side three partial winding hb phase voltage becomes:

$|V_{L1-O}|=\sqrt{3}x|E_v|$

Furthermore, when the secondary-side second winding b and partial winding hb winding ratio is 1:(1/Y), $|V_{L1-O}|=\sqrt{3}x|E_v|=\sqrt{3}\ x(1/Y)x|E_v|$.

In addition, when the winding ratio of the "primary-side winding" and the "secondary-side winding" 1:(1/X), the relationship between the size $|E_v|$ of the "secondary-side three phase output section phase voltage" and the size $|E_v|$ of the "primary-side phase voltage" becomes $|E_v|=(1/X)x|E_V|$.

Therefore the relationship between the size $|V_{L1-O}|$ of the secondary-side "line voltage $V_{L1-O}$" and the size $|E_V|$ of primary-side second winding B phase voltage becomes:

$|V_{L1-O}|=\sqrt{3}x(1/Y)x|E_v|=\sqrt{3}x(1/Y)x(1/X)x|E_V|$.

In a delta connection, the size $|E_V|$ of the "primary-side phase voltage" and the size $|V_{V-W}|$ of the "primary-side line voltage" is:

$|E_V|=|V_{V-W}|$.

Therefore the relationship between the size $|V_{L1-O}|$ of the "secondary-side single phase three wire output section line voltage" and the size $|V_{V-W}|$ of the "primary-side line voltage" is:

$|V_{L1-O}|=\sqrt{3}x(1/Y)x(1/X)x|E_V|=\sqrt{3}x(1/Y)x(1/X)x|V_{V-W}|$.

I.e., $|V_{L1-O}|=\sqrt{3}x(1/Y)x(1/X)x|V_{V-W}|$.

Similarly, $|V_{L2-O}|=\sqrt{3}x(1/Y)x(1/X)x|V_{W-U}|$.

In this manner, the phase and size of the "line voltage $V_{L1-O}$" between output terminal L1 and neutral point O, and "line voltage $W_{L2-O}$" between output terminal L2 and neutral point O can be obtained as a single phase three wire-type of output line voltage at the secondary-side connection.

When a number of windings is assigned to the first through third windings a through c so that the three phase output "line voltage $V_{u-v}$"=200V, what happens is that the single phase output "line voltage $V_{u-O}$"=200x(1/√3)≈115V. Therefore it is not possible to simultaneously extract three phase 200V and single phase 100V outputs from a three phase four wire output section alone.

In contrast, even when winding counts are assigned to first through third windings a through c so that three phase output voltage is "line voltage $V_{u-v}$"=200V, when the $|V_{L1-O}|=\sqrt{3}x(1/Y)x|E_V|$, if X=1 and Y=2 are selected, the single phase output "line voltage $V_{L1-O}$" and "line voltage $V_{L2-O}$"=√3x(1/2)x 115≈100V. Therefore a three phase 200V and a single phase 100V output can be simultaneously extracted. Thus in the present invention a three phase output (e.g. 200V) and a single phase output at one-half that voltage (e.g., 100V) can be simultaneously extracted.

Note that by arranging the partial winding hb, partial winding hc, first additional winding d1, and second additional winding d2 to each have the same number of windings, and by changing the position of the connecting points on second and third windings b and c, the size of "line voltage $V_{L1-O}$"="line voltage $V_{L2-O}$" can be changed to a desired value.

Figure 6:
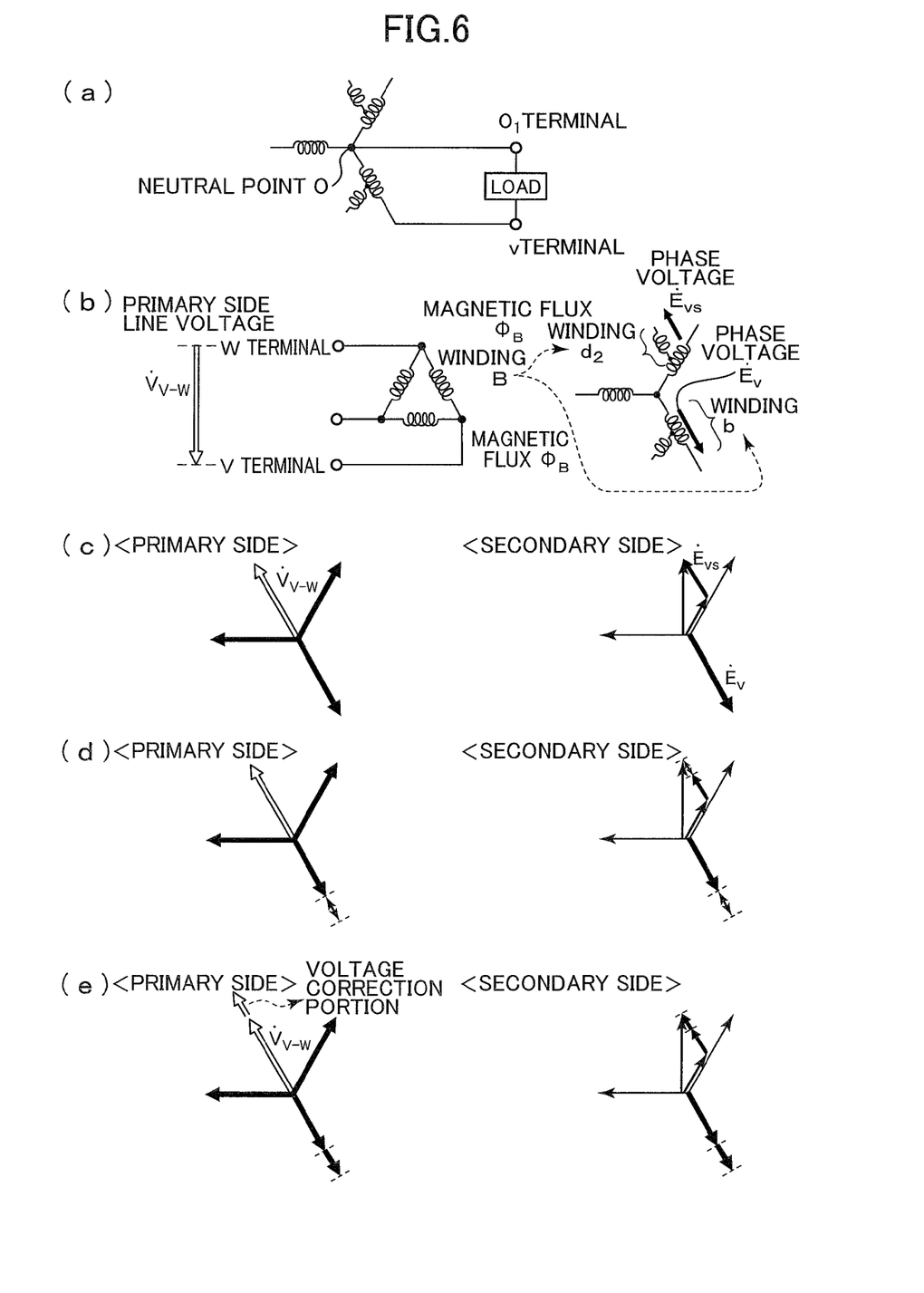

Next, referring to FIG. 6, we discuss an example of controlling output imbalance in the first embodiment shown in FIGS. 1 through 5.

As shown in FIG. 1, the control circuit 7 is furnished with a voltage detection means 71 for detecting the output voltages of a three phase four wire output, a correction computation means 72 for calculating deviations between detected values and target values for the output voltages of the three phase four wire output, and computing correction values based on the calculated deviations, and an inverter control means 73 for separately controlling the line voltages input from the three phase inverter 4 to the three windings A through C on the primary side connection of the three phase transformer 5 based on the correction values.

Note that it is desirable to set the target values at the output voltages at no-load time, i.e. at the output voltages shown in the vector diagram in FIG. 4(b).

When, due to the operating condition of electrical equipment (load) connected to the secondary-side, an unbalance occurs at the secondary-side connection, i.e., when balance between the phase voltages on the secondary-side is lost, the line voltages $V_{U-V}$, $V_{V-W}$, and $V_{W-U}$ are adjusted relative to the respective windings on the primary-side connection of the three phase transformer 5 through adjustment of the three phase inverter 4 outputs, lo thereby eliminating the unbalance in the outputs on the three phase transformer 5 secondary-side connection 52.

Here, in the example shown in FIG. 6(a), a single phase load is connected between the neutral point O on the three phase transformer 5 secondary-side connection 52 and the v terminal connected to the other end of the second winding b.

As shown in FIG. 6(b), a magnetic flux $\phi_B$ is generated on the second winding B when "line voltage $V_{V-W}$" is supplied to the primary-side second winding B. This magnetic flux $\phi_B$ causes a "phase voltage $E_v$" to be generated on the secondary-side second winding b. This magnetic flux $\phi_B$ also causes a "phase voltage $E_{vs}$" to be generated on the second additional winding d2.

As shown in FIG. 6(c), when no load is present, the primary-side "line voltage $V_{V-W}$," the secondary-side "phase voltage $E_v$," and the "phase voltage $E_{vs}$" are the same as what is shown in the FIG. 4(b) vector diagram.

As shown in FIG. 6(d), however, when a load is connected and operated, the "phase voltage $E_v$" causes "load current $I_v$" to flow. As a result, a "magnetomotive force Nb×$I_v$" is generated on the secondary-side second winding b. Here "Nb" indicates the number of windings on the second winding b.

Note that when no load is present, "load current $I_v$"=0, therefore the "magnetomotive force Nb×$I_v$"=0.

For example, when this "magnetomotive force Nb×$I_v$" changes in the opposite direction to the change in the magnetic flux $\phi_B$, the decline in magnetic flux passing through the primary-side second winding B and the secondary-side second winding b and second additional winding d2 causes a decline in the "phase voltage $E_v$" generated on the secondary-side second winding b and the "phase voltage $E_{vs}$" generated on the second additional winding d2. This type of unbalanced state is shown by shortening the vector arrow in FIG. 6(d).

Note that because the "load current $I_v$" phase changes depending on the connected load, it can occur that the "magnetomotive force Nb×$I_v$" changes in approximately the same direction as the magnetic flux $\phi_B$. In such cases, the magnetic flux passing through the secondary-side second winding b and second additional winding d2 conversely increases, and the second winding b "phase voltage $E_v$" and second additional winding d2 "phase voltage $E_{vs}$" increase.

In an unbalanced state like this, the only output obtained will be different from the desired voltage, whether the single phase load is connected between the terminal L2 and the neutral point O or between the terminal L1 and terminal L2.

Therefore as shown in FIG. 6(e), the "line voltage $V_{V-W}$" applied to the corresponding second winding B in the primary-side is increased by the amount that the secondary-side second winding b "phase voltage $E_v$" and second additional winding d2 "phase voltage $E_{vs}$" has diminished from the target value. The imbalance is thereby removed.

Note that when loads are respectively connected between the multiple output terminals on the secondary-side, the imbalance is removed by individually controlling the corresponding line voltages in the primary-side first through third windings A through C.

Figure 7:
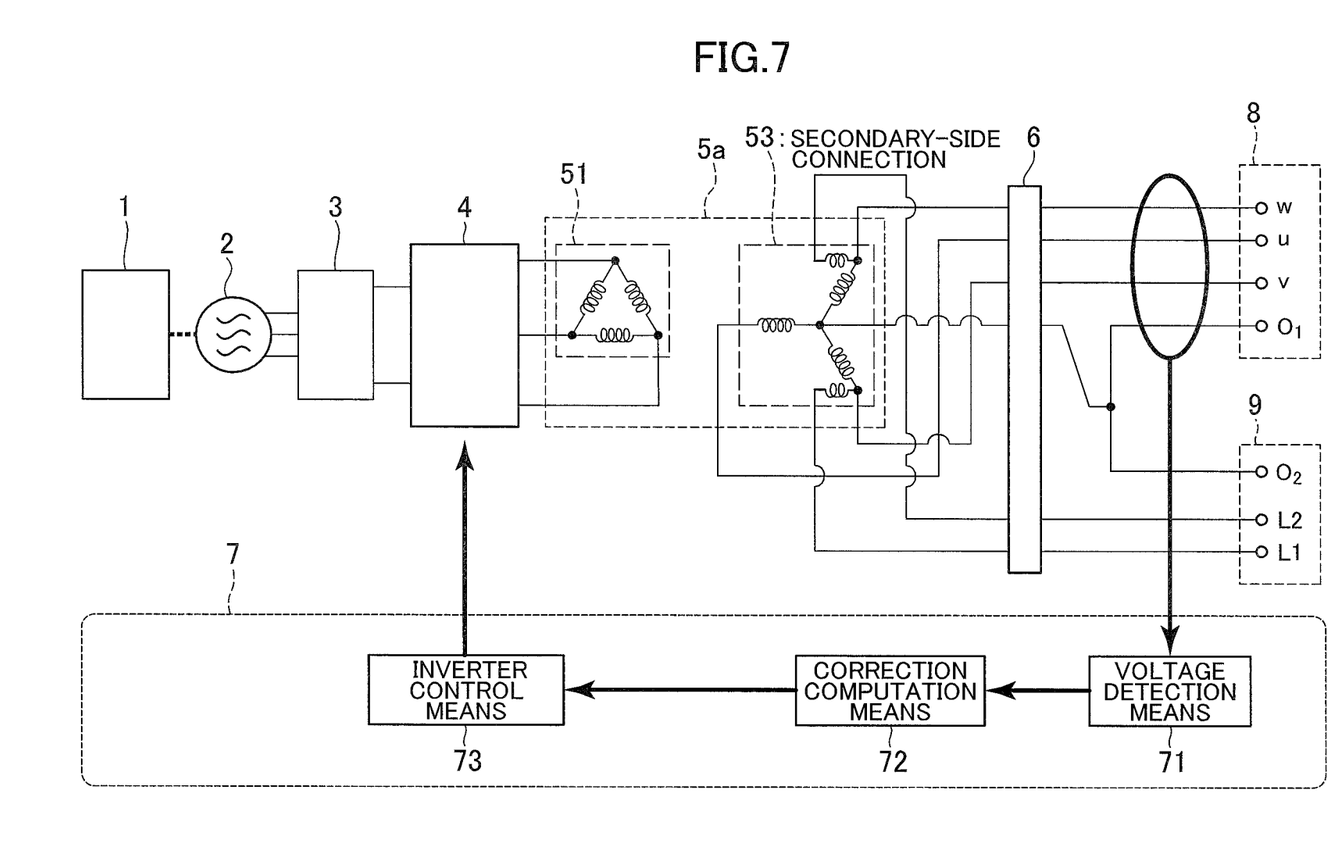
FIG. 7: A block circuit diagram explaining the configuration of a three phase inverter-type generator according to a second embodiment of the present invention.

Next, referring to FIG. 7, we discuss an example of the second invention as a second embodiment.

The three phase inverter-type generator of the second embodiment has the same constitution as the first embodiment shown in FIG. 1, except for the three phase transformer 5a secondary-side connection 53.

Figure 8:
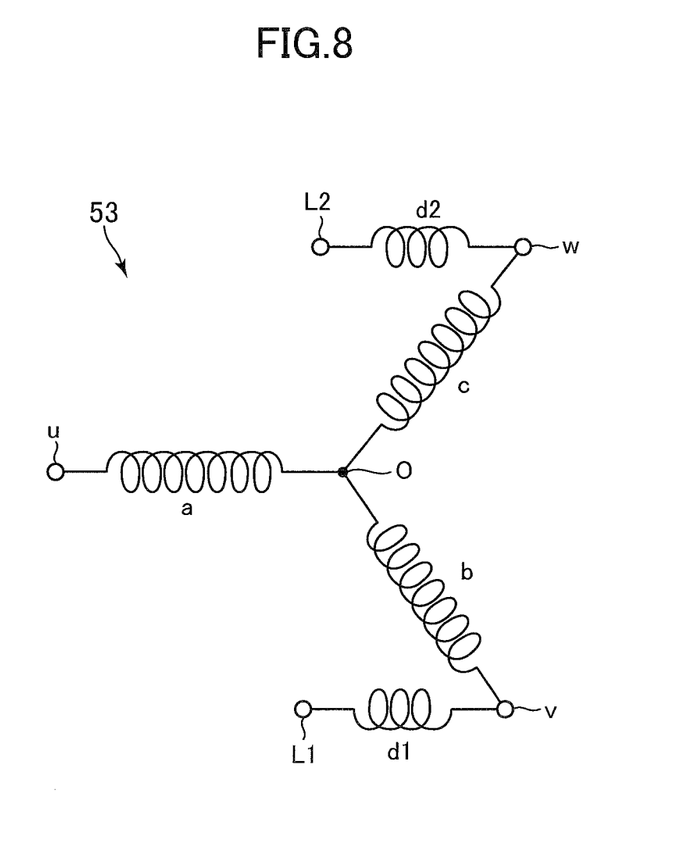
FIG. 8: A circuit diagram of the secondary-side connection in a three phase transformer in the second embodiment.

As shown in FIG. 8, secondary-side connection 53 has first through third windings a through c, and first and second additional windings d1 and d2. First through third windings a through c form a star connection in which one end of each is respectively connected at a neutral point O. First through third windings a through c each have the same number of windings, and also have a mutual phase difference of 120°.

One end of the first additional winding d1 is connected at a position H1, which is a predetermined number of windings N from the neutral point O on the second winding b. The first additional winding d1 has half the predetermined number of windings N, and has the same phase as the first winding a. I.e., first additional winding d1 has half the number of windings (N/2) as the partial winding hb from the neutral point O within the second winding b to the position H1, and is connected to position H1 on the second winding b so as to be in the same phase relative to the phase of the first winding a.

Note that in the example shown in FIG. 8, one end of the first additional winding d1 is connected to the other end of the second winding b. In the present invention, one end of the first additional winding d1 may be connected to any desired position on the second winding b.

Also, one end of the second additional winding d2 is connected at a position H2, which is the same number of windings as the predetermined number of windings N from the neutral point O on the third winding c. The second additional winding d2 has half the predetermined number of windings N, and has the same phase as the first winding a. I.e., second additional winding d2 has half the number of windings (N/2) as the partial winding he from the neutral point O within the third winding c to the position H2, and is connected to the position H2 on the third winding c so as to be in the same phase relative to the phase of the first winding a.

Note that in the example shown in FIG. 8, one end of the second additional winding d2 is connected to the other end of the third winding c. In the present invention, one end of the second additional winding d2 may be connected to any desired position on the third winding c.

As shown in FIGS. 9(a): and 9(b), the phase and size of the secondary-side three phase output line voltage vector in the second embodiment is the same as that in the first embodiment, and the secondary-side "line voltage $V_{u-v}$," as the sum of the first winding a "phase voltage $E_u$" vector and second winding b "phase voltage $E_v$" opposite vector, is given as:

$$V_{u-v}=E_u-E_v.$$

The phase of this "line voltage $V_{u-v}$" on the secondary-side is delayed by 150° relative to the phase of the "line voltage $V_{U-V}$" the primary-side.

Also, the secondary-side "line voltage $V_{v-w}$" as the sum of the second winding b "phase voltage $E_v$" vector and the third winding c "phase voltage $E_w$" opposite vector, is given as:

$$V_{v-w}=E_v-E_w.$$

The phase of this "line voltage $V_{v-w}$" on the secondary-side is delayed by 270° relative to the phase of the "line voltage $V_{U-V}$" the primary-side.

Also, the secondary-side "line voltage $V_{w-u}$" as the sum of the third winding c "phase voltage $E_w$" vector and the first winding a "phase voltage $E_u$" opposite vector, is given as:

$$V_{w-u}=E_w-E_u.$$

The phase of this "line voltage $V_{w-u}$" on the secondary-side is delayed by 30° relative to the phase of the "line voltage $V_{U-V}$" on the primary-side.

Figure 9:
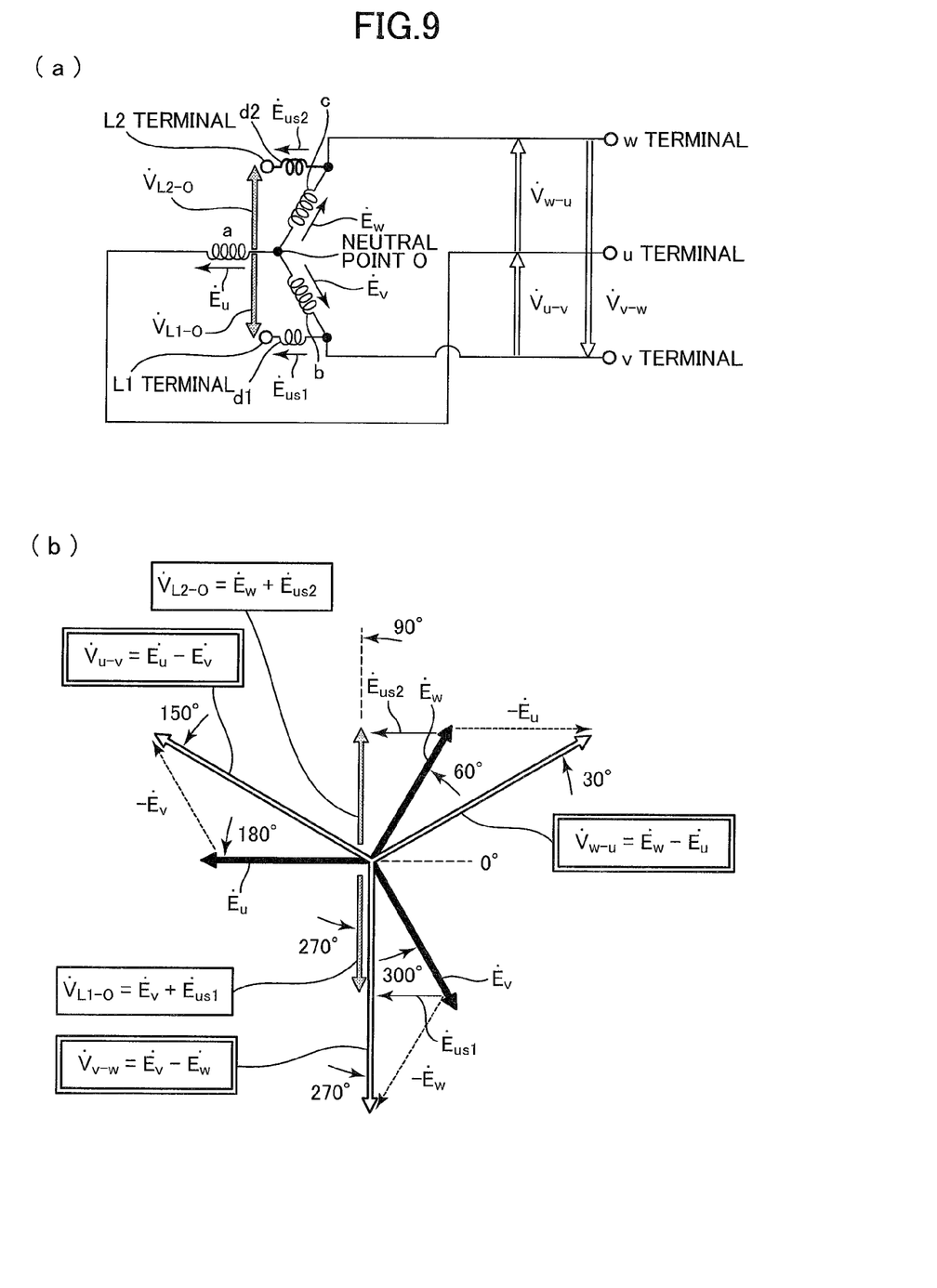

The single phase output "line voltage $V_{L1-O}$" on the secondary-side of the second embodiment, as the vector sum of the second winding b "phase voltage $E_v$" and the first additional winding d1 "phase voltage $E_{us1}$" in the example shown in FIG. 9, becomes $V_{L1-O}=E_v+E_{us1}$.

The phase of this secondary-side "line voltage $V_{L1-O}$" is delayed by 270° relative to the phase of the primary-side "line voltage $V_{U-V}$".

The secondary-side "line voltage $V_{L2-O}$" as the vector sum of the third winding c "phase voltage $E_w$" and the second additional winding d2 "phase voltage $E_{us2}$," becomes $$V_{L2-O}=E_w+E_{us2}.$$

The phase of this secondary-side "line voltage $V_{L2-O}$" is delayed by 90° relative to the phase of the primary-side "line voltage $V_{U-V}$".

In the second embodiment, as in the above-described first embodiment, even if a number of windings is imparted to first through third windings a through c such that the three phase output "line voltage $V_{u-v}$"=200V, the single phase output "line voltage $V_{L1-O}$"="line voltage $V_{L2-O}$"=100V. Therefore a single phase 100V output can be extracted. Thus in the present invention a three phase output (e.g. 200V) and a single phase output at half that voltage (e.g., 100V) can be simultaneously extracted.

Note that by arranging for the respective number of windings of the first additional winding d1 and second additional winding d2 to be half the number of windings on the partial winding hb on the second winding b and the partial winding hc on the third winding c to change the positions of the connecting points of the first and second additional windings d1 and d2, the size of the "line voltage $V_{L1-O}$"="line voltage $V_{L2-O}$" can be changed to a desired value.

In the second embodiment, as well, as in the above-described first embodiment, when a load is connected between the output terminals on the secondary-side, the imbalance is removed by individually controlling the line voltages corresponding to the primary-side first through third windings A through C.

Figure 10:
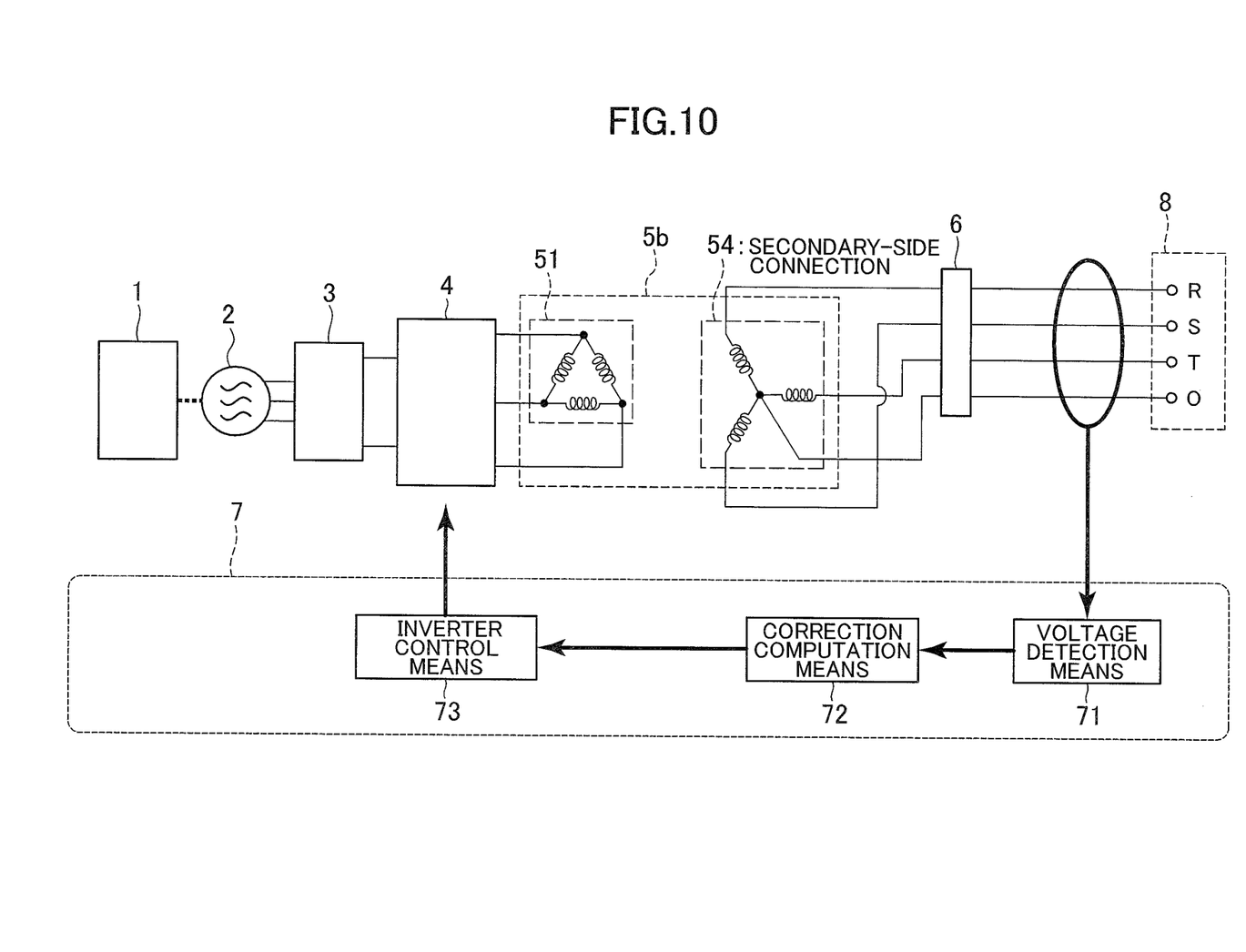
FIG. 10: A block circuit diagram explaining the configuration of a three phase inverter-type generator according to a third embodiment of the present invention.

Next, referring to FIG. 10, we discuss an example of the third invention as a third embodiment.

The three phase inverter-type generator of the third embodiment has the same constitution as the first embodiment shown in FIG. 1, except for the three phase transformer 5b secondary-side connection 54.

As shown in FIG. 10, the secondary-side connection 54 has first through third windings a through c. First through third windings a through c form a star connection in which one end of each is respectively connected at a neutral point O. And the first through third windings a through c each have the same number of windings, and also have a mutual phase difference of 120°.

In the three phase inverter-type generator of the third embodiment, a three phase transformer 5b, being a high frequency transformer, is provided between the three phase inverter 4 and the low pass filter 6. A rectangle wave output voltage generated by the 10-20 kHz carrier frequency of a three phase inverter, for example, is input into this three phase transformer 5b. The three phase transformer 5b can therefore be made more compact and lighter weight than a low frequency transformer using the 50 Hz or 60 Hz AC voltage of a commercial power supply. As a result, the three phase inverter-type generator can be made more compact and light weight.

In the third embodiment, as well, as in the above-described first embodiment, when a load is connected between the output terminals on the secondary-side, the imbalance is removed by individually controlling the line voltages corresponding to the primary-side first through third windings A through C.

In the embodiment described above we discussed examples in which the present invention is constituted under particular conditions, but the invention is not limited thereto, and various modifications and combinations of the present invention are possible. In the embodiment described above, we discussed an example in which the primary-side connection on the three phase transformer was a delta connection, but in the present invention the structure of the primary-side connection is not limited thereto. For example, a star connection (Y connection) may also be adopted for the primary-side connection.

Also, in the above-described we discussed an example in which a three phase transformer, being a high frequency transformer, is placed between a three phase inverter and a filter, but it is also acceptable in the first and second inventions to provide a three phase transformer, being a low frequency transformer, on the output side of the filter.

Also, in the embodiment described above we discussed an example in which the primary-side phase voltage and the secondary-side phase voltage on the three phase transformer were in the same phase, but it is also acceptable in the present invention for the primary-side phase voltage and secondary-side phase voltage to be in opposite phase. The secondary-side line voltage obtained when the primary-side phase voltage and secondary-side phase voltage are in opposite phase is 180° out of phase relative to the secondary-side line voltage obtained when the primary-side phase voltage and secondary-side phase voltage are in the same phase.

In addition, in the first invention one end of the first and second additional windings can be respectively connected to any desired position on the second and third windings. For example, the connection may be made at a position at which the number of windings from the neutral point is ½ the total number of windings on the second and third windings.

Also, in the second invention one end of the first and second additional windings can be respectively connected to any desired position on the second and third windings without being limited to the other end of the second and third windings.

EXPLANATION OF REFERENCE NUMERALS

1: engine
2: AC generator
3: rectifier
4: three phase inverter
5, 5a, 5b: three phase transformer
6: filter
7: control circuit
8: three phase four wire output terminal section
9: single phase three wire output terminal section
51: primary-side connection
52, 53, 54: secondary-side connection
71: voltage detection section
72: correction computation section
73: inverter control section

The invention claimed is:

1. A three phase inverter-type generator comprising:
an engine;
an AC generator driven by the engine;
a rectifier for converting an output of the AC generator into a DC voltage;
a three phase inverter for converting an output of the rectifier into a three phase AC voltage; and
a three phase transformer connected to an output side of the three phase inverter;
wherein the three phase transformer has a primary-side connection and a secondary-side connection having a three phase connection;
the secondary-side connection having,
first through third windings forming a star connection in which one end of each is respectively connected to a neutral point, with each having the same number of windings and a mutual phase difference of 120°;
a first additional winding connected at one end to a position located a predetermined number of windings from the neutral point on the second winding, with the same number of windings as the predetermined number of windings, and having the opposite phase to that of the third winding; and
a second additional winding connected at one end to a position which is the same number of windings as the predetermined number of windings from the neutral point on the third winding, with the same number of windings as the predetermined number of windings, and having the opposite phase to that of the second winding;
whereby a three phase four wire output is output from the respective other ends of the first through third windings and from the neutral point, and a single phase three wire output is output from the respective other ends of the first and second additional windings and from the neutral point.

2. The three phase inverter-type generator of claim 1, wherein a rectangle wave output of the three phase inverter is input into the three phase transformer, and
further comprising a filter for obtaining a sinusoidal AC voltage from the output of the three phase transformer.

3. The three phase inverter-type generator of claim 1, further comprising:
a voltage detection means for detecting output voltages on the three phase four wire output;
a correction computation means for calculating deviations between detected values and target values for the output voltages of the three phase four wire output, and computing correction values based on that calculated deviations; and
an inverter control means for individually controlling line voltages input from the three phase inverter to the three windings on the primary-side connection of the three phase transformer based on the correction values.

4. A three phase inverter-type generator comprising:
an engine;
an AC generator driven by the engine;
a rectifier for converting the output of the AC generator into a DC voltage;
a three phase inverter for converting the output of the rectifier into a three phase AC voltage; and
a three phase transformer connected to the output side of the three phase inverter;
wherein the three phase transformer has a primary-side connection and a secondary-side connection having a three phase connection;
the secondary-side connection has:
first through third windings forming a star connection in which one end of each is respectively connected to a neutral point, with each having the same number of windings and a mutual phase difference of 120°;
a first additional winding in which one end is connected at a position located a predetermined number of windings from the neutral point on the second winding, with half the number of windings as the predetermined number of windings, and having the same phase to as first winding; and
a second additional winding connected at one end to a position which is the same number of windings as the predetermined number of windings from the neutral point on the third winding, with half the number of windings as the predetermined number of windings, and having the same phase to as first winding;
whereby a three phase four wire output is output from the respective other ends of the first through third windings and from the neutral point, and a single phase three wire output is output from the respective other ends of the first and second additional windings and from the neutral point.

5. The three phase inverter-type generator of claim 4, wherein a rectangle wave output of the three phase inverter is input into the three phase transformer, and
further comprising a filter for obtaining a sinusoidal AC voltage from the output of the three phase transformer.

6. The three phase inverter-type generator of claim 4, further comprising:
a voltage detection means for detecting output voltages on the three phase four wire output;
a correction computation means for calculating deviations between detected values and target values for the output voltages of the three phase four wire output, and computing correction values based on that calculated deviations; and
an inverter control means for individually controlling line voltages input from the three phase inverter to the three windings on the primary-side connection of the three phase transformer based on the correction values.

7. A three phase inverter-type generator comprising:
an engine;
an AC generator driven by the engine;
a rectifier for converting an output of the AC generator into a DC voltage;
a three phase inverter for converting an output of the rectifier into a three phase AC voltage;
a three phase transformer for transforming an output of the three phase inverter; and a filter for obtaining a sinusoidal AC voltage from an output of the three phase transformer, wherein the three phase transformer has a primary-side connection and a secondary-side connection having a three phase connection, the secondary-side connection has first through third windings forming a star connection in which one end of each is respectively connected to a neutral point, with each having the same number of windings and a mutual phase difference of 120°, and wherein a three phase four wire output is output from the respective other ends of the first through third windings and from the neutral point.

8. The three phase inverter-type generator of claim 7, further comprising:

a voltage detection means for detecting output voltages on the three phase four wire output;

a correction computation means for calculating deviations between detected values and target values for the output voltages of the three phase four wire output, and computing correction values based on that calculated deviations; and an inverter control means for individually controlling line voltages input from the three phase inverter to the three windings on the primary-side connection of the three phase transformer based on the correction values.

\* \* \* \* \*